(12) United States Patent
Yamauchi et al.

(10) Patent No.: US 8,156,512 B2
(45) Date of Patent: Apr. 10, 2012

(54) OPTICAL DISC DRIVE HAVING IMPACT ABSORBING MECHANISM

(75) Inventors: Yoshiaki Yamauchi, Omitama (JP); Hiroshi Yamagishi, Chiba (JP); Kuniyuki Kimura, Fujisawa (JP); Shinya Tsubota, Mito (JP); Tatsumi Uchigiri, Hitachi (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 1101 days.

(21) Appl. No.: 11/668,045

(22) Filed: Jan. 29, 2007

(65) Prior Publication Data

US 2007/0234374 A1    Oct. 4, 2007

(30) Foreign Application Priority Data

Apr. 4, 2006   (JP) .................. 2006-102629

(51) Int. Cl.
*G11B 7/00* (2006.01)
*G11B 33/08* (2006.01)

(52) U.S. Cl. ........................ 720/671; 720/651

(58) Field of Classification Search .......... 720/648–651, 720/655, 671–680, 689, 691–694, 601, 688; 360/99.02, 99.03, 99.06, 99.07, 97.02

See application file for complete search history.

(56) References Cited

U.S. PATENT DOCUMENTS

| | | | |
|---|---|---|---|
| 5,640,290 A | | 6/1997 | Khanna et al. |
| 5,768,249 A | * | 6/1998 | Ro et al. .......... 720/694 |
| 5,956,314 A | * | 9/1999 | Ishimatsu et al. .......... 720/693 |
| 6,178,154 B1 | * | 1/2001 | Inata et al. .......... 720/675 |
| 6,292,455 B1 | * | 9/2001 | Saruwatari et al. .......... 720/692 |
| 6,385,161 B1 | * | 5/2002 | Begley .......... 720/671 |
| 6,912,723 B2 | * | 6/2005 | Yumitori et al. .......... 720/692 |
| 6,922,836 B2 | * | 7/2005 | Watanabe .......... 720/601 |
| 6,925,647 B1 | * | 8/2005 | Kabasawa .......... 720/601 |
| 2005/0204373 A1 | * | 9/2005 | Ueno et al. .......... 720/616 |

FOREIGN PATENT DOCUMENTS

| | | |
|---|---|---|
| JP | 3-168985 | 7/1991 |
| JP | 06-187756 | 7/1994 |
| JP | 11-039809 | 2/1999 |
| JP | 11-296866 | 10/1999 |
| JP | 2000-285618 | 10/2000 |
| JP | 2002-230922 | 8/2002 |

(Continued)

OTHER PUBLICATIONS

Notice of Reasons for Rejection dated May 18, 2010; Japanese Application No. 2006-102629.

Japanese Office Action dated Dec. 21, 2010; Application No. 2006-102629.

(Continued)

*Primary Examiner* — Nathan Danielsen

(74) *Attorney, Agent, or Firm* — Antonelli, Terry, Stout & Kraus, LLP.

(57) ABSTRACT

The present invention provides a thin optical disc drive whose impact resistance performance is improved.

An under cover 19 is provided with a collision evasion hole 21 at a position corresponding to an end of an optical head housing 25. Moreover, a bottom cover 4 is provided with an impact force buffering member 22 at a position corresponding to the collision evasion hole. When an impact force acts on an optical disc drive 1, the impact force to the optical head housing 25 is buffered by the structure. Consequently, it is possible to prevent the optical head 8 from being damaged, and it is possible to improve the reliability of the optical disc drive 1.

4 Claims, 8 Drawing Sheets

FOREIGN PATENT DOCUMENTS

| | | |
|---|---|---|
| JP | 2003-249041 | 9/2003 |
| JP | 2004-158160 | 6/2004 |
| JP | 2005-122827 | 5/2005 |
| JP | 2005-182962 | 7/2005 |

OTHER PUBLICATIONS

Chinese Office Action dated Jul. 17, 2009; Application No. 200710085074X.

* cited by examiner

TAPER STRUCTURE OF UNDER COVER

TAPER STRUCTURE OF OPTICAL HEAD HOUSING

OPTICAL DISC DRIVE HAVING IMPACT ABSORBING MECHANISM

BACKGROUND OF THE INVENTION

1. Field of the Invention

The present invention relates to a thin optical disc drive that is referred to as a slim drive, and more particularly relates to an optical disc drive that has a mechanism for preventing damage to inner parts caused by an impact and the like.

2. Description of the Related Art

In an optical disc drive for CD, DVD and the like, which is installed in a laptop personal computer and the like, its structure becomes slimmer, and a slim drive having a thickness of 9.5 mm has been mainly used instead of a currently used drive having a thickness of 12.7 mm. Such a thin optical disc drive has a narrow inner space, and therefore, a collision between inner parts caused by an impact is apt to occur. Thus, there is a fear that the damage to parts causes the deterioration in the reliability performance of the optical disc drive. In particular, in an optical head, which is a main part inside the optical disc drive, its support rigidity is a low in radial direction. Thus, when an impact force is applied even in non-operation, the optical head is moved in the radial direction, or the deformation of the component parts due to the impact force causes the optical head to be elastically deformed in the upward/downward direction. Hence, there is a fear that the optical head will be contacted with a component part and it causes the optical head and/or the component part to be damaged.

Also, the foregoing optical disc drive is required to have the structure that can endure an impact test predetermined by a personal computer (PC) maker.

In order to cope with the foregoing problems, there are a method for absorbing the impact force with a buffering structure which is disposed at a position where the optical head may be brought into contact with other parts when the optical head is moved in disc radial direction, a method for increasing the support rigidity so that, even if the impact force is applied, the optical head is not moved to be brought into contact with the other parts, or the like.

As a method which uses the impact buffering member between the contact portions, a patent document 1 discloses a structure such that an elastic member is mounted at a position where, when an optical head is moved to outer circumferential position on an disc, a tip of a rack gear mounted to an optical head support member is brought into contact, or the support member is brought into contact. Also, a patent document 2 discloses a structure such that first and second buffering members for buffering the collision with an optical head support member are mounted on an inner circumference and outer circumference of a guide member for guiding the optical head to be moved in the disc radial direction.

On the other hand, as a method for increasing the support rigidity in the disc radial direction of the optical head support member, a patent document 3 discloses a structure for stopping the movement of an optical head in such a way that a bearing serving as a running mechanism part provided in the support member is restrained by a stopper which is raised and lowered by a solenoid through a link mechanism.

[Patent Document 1] Japanese Patent Laid Open H-11-39809
[Patent Document 2] Japanese Patent Laid Open 2000-285618
[Patent Document 3] Japanese Patent Laid Open H-6-187756

SUMMARY OF THE INVENTION

The technique described in the patent document 1 has a structure to absorb the reaction of the impact force applied when the optical head is moved to the outer circumference position of the disc and the impact force caused by a shaft vibration of a warm gear serving as a guide mechanism or the like, and it is intended to buffer the radial impact force. The technique described in the patent document 2 is designed such that a first buffering member is mounted in the inner circumference of the guide member so that when a supporting member supporting the optical head is moved in the disc radial direction, the first buffering member buffers the collision of the optical head supporter with the inner circumference and outer circumference and a second buffering member is mounted in a chassis portion to which the optical head is brought into contact with the outer circumference, so that the impact in the disc radial direction is consequently buffered. The technique described in the patent document 3 is designed such that the bearing of the carriage on which the optical head is mounted is restrained by the stopper which is driven to be raised and lowered by the electromagnetic solenoid through the link mechanism, and when the impact force is applied, the movement of the optical head in the disc radial direction is prevented, thereby avoiding the collision with the other parts.

On the contrary, since the impact test of the optical disc drive predetermined by the PC maker is carried out in the non-operation state, the optical head is located at the innermost circumference of disc in the disc radius position, and the direction of the impact force application is the upward/downward, leftward/rightward and forward/backward directions of the optical disc drive. As for the impact direction applied to the optical head, the directions other than the disc radial direction must be considered. Also, in the slim drive, the optical head is not moved to the outer circumference of disc, due to the support rigidity of the optical head, even if the impact acts on the disc radial direction. Taking the impact direction of the optical head into consideration, it must have the durability against the upward/downward collision in narrow space between parts. Thus, by the examples of the impact force buffering structure to the disc radial direction movement of the optical head disclosed in the patent documents 1 to 3, it is difficult to improve the impact force absorption effect of the thin optical disc drive.

The present invention is proposed in view of such environments. Therefore, it is an object of the present invention to provide a thin optical disc drive whose impact resistance performance is improved.

In order to solve the above-mentioned problems, the present invention provides an optical disc drive having a casing including a top cover and a bottom cover, characterized in that the bottom cover has a concavity to absorb an impact to an optical head.

Also, the present invention provides an optical disc drive having a casing including a top cover and a bottom cover, characterized in that the bottom cover has a hole to absorb an impact to an optical head.

The concavity or hole of the bottom cover preferably has a member to absorb the impact to the optical head.

As mentioned above, according to the present invention, the thin optical disc drive having a structure for preventing the damage to the inner parts caused by the impact and the like is provided.

DETAILED DESCRIPTION OF THE PREFERRED EMBODIMENTS

The best mode of carrying out an optical disc drive of the present invention will be described below with reference to the attached drawings. FIGS. 1 to 8B are views exemplifying the embodiments of the present invention. In those drawings, the portion to which the same symbol is assigned indicates the same member, and its basic configuration and operation are assumed to be similar.

Figure 1:
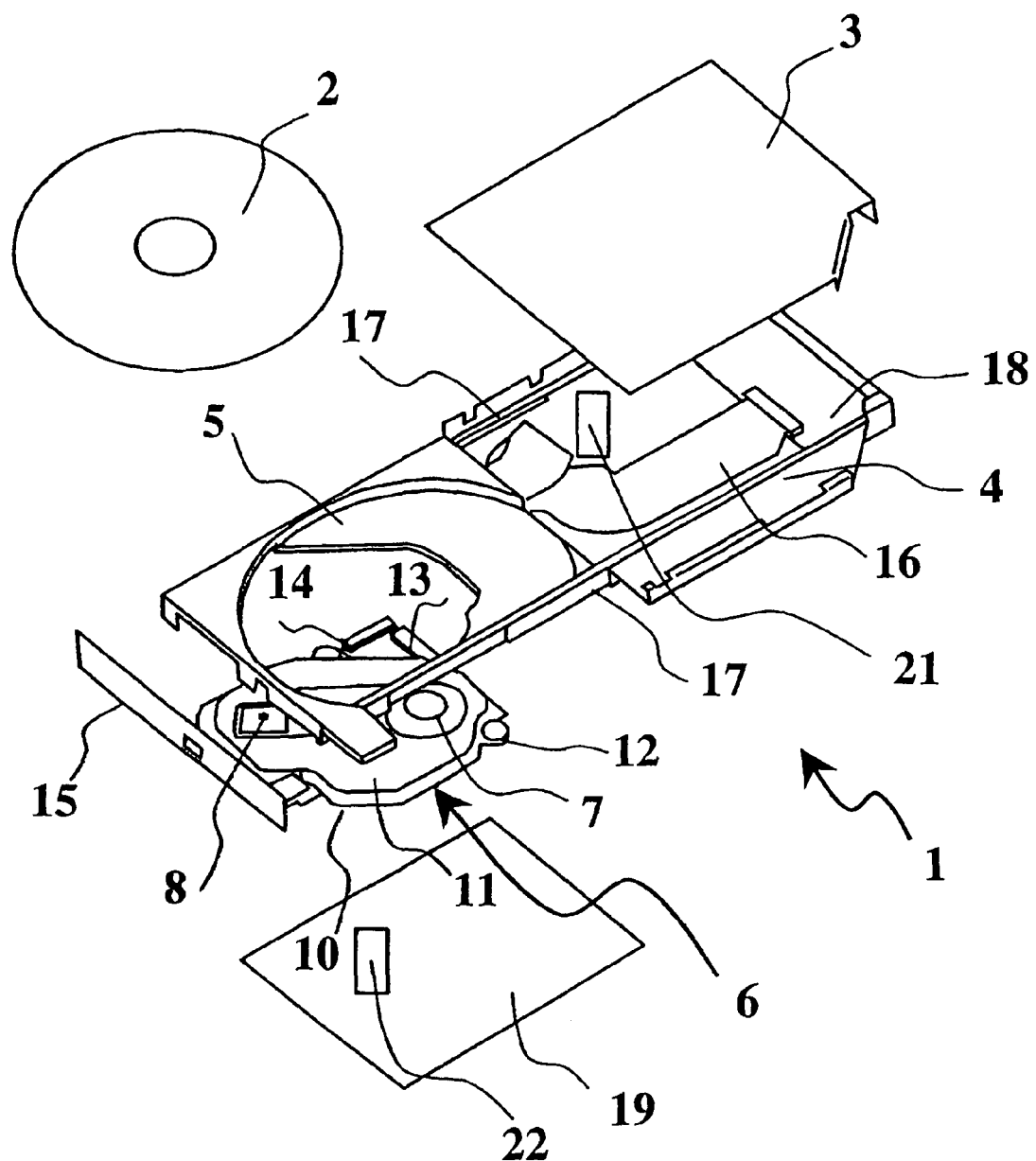
FIG. 1 is a view showing a structure of an optical disc drive according to the present invention.

At first, the configuration of the optical disc drive according to one embodiment of the present invention is explained. FIG. 1 is an exploded perspective view of the optical disc drive and recording medium according to the present embodiment. An optical disc drive 1 records information to a record surface of a disc 2 and replays it from a record surface of a disc 2. The disc 2 is CD, DVD, BD (Blue Ray Disc) or the like that has a diameter of 120 mm and a thickness of 1.2 mm as its dimension.

As shown in FIG. 1, the optical disc drive 1 has a casing which is made by a top cover 3 and a bottom cover 4 being engaged, screwed, assembled and then molded. The top cover 3 and the bottom cover 4 are produced by pressing and molding thin metal plates. A disc tray 5 which is a molded resin article is placed inside the casing. A front panel 15 is mounted to the front end of the disc tray 5.

A unit mechanism 6 is mounted to a lower surface of the disc tray 5. The unit mechanism 6 is attached to the disc tray 5 through a plurality of insulators 12 consisting of elastic members. The insulator 12 attenuates the vibration and impact transmitted to the unit mechanism 6 from outside the drive and the vibration and impact transmitted from the unit mechanism 6 to the outside.

The unit mechanism 6 has a chassis 10, to which a spindle motor 7 for rotating and driving the disc 2, a turn table for supporting the disc 2, an optical head 8 for replaying the information from the record surface of the disc 2 or recording the information to the record surface, a driving device for moving the optical head 8 along the radial direction of the disc 2, a spindle motor board 13, and a unit cover 11 for preventing the contact with those parts and electric noise are mounted.

An under cover 19 of a thin plate is screwed to the lower surface of the disc tray 5 to which the unit mechanism 6 is mounted, thereby preventing the contact between the components of the unit mechanism 6 and the bottom cover 4.

A circular groove, which is slightly larger than an outer diameter of the disc 2 is formed on the center of the disc tray 5. A part of the bottom surface of this circular groove is cut away. Thus, the unit cover 11, the optical head 8 and the spindle motor 7 on the unit mechanism 6 are exposed. With the cut portion of the disc tray 5, the space between the optical head 8 mounted on the unit mechanism 6 and the disc 2 is reserved. A main circuit board 18 is placed on the back end of the casing. A connector is attached to the main circuit board 18. On the other hand, a connector portion 14 is attached to the spindle motor board 13. The connector of the main circuit board 18 and the connector portion 14 of the spindle motor board 13 are electrically connected to each other through an FPC (Flexible Printed Circuit board) 16. In this way, the spindle motor 7, the optical head 8, the optical head moving device and the like, which are mounted to the chassis 10, and the main circuit board 18 are electrically connected.

This optical disc drive 1 is characterized in that a buffering structure is provided such that a part of the under cover 19 has a contact evasion hole 21 of an optical head housing 25, and a part of the bottom cover 4 has an impact force buffering member 22. By the way, this optical disc drive 1 is the slim type used in a laptop type personal computer, and this has a width of W=130 mm, a depth of D=130 mm and a thickness of H=12.7 mm. By the way, in a case of a super slim type, its thickness is H=9.5 mm.

Figure 2:
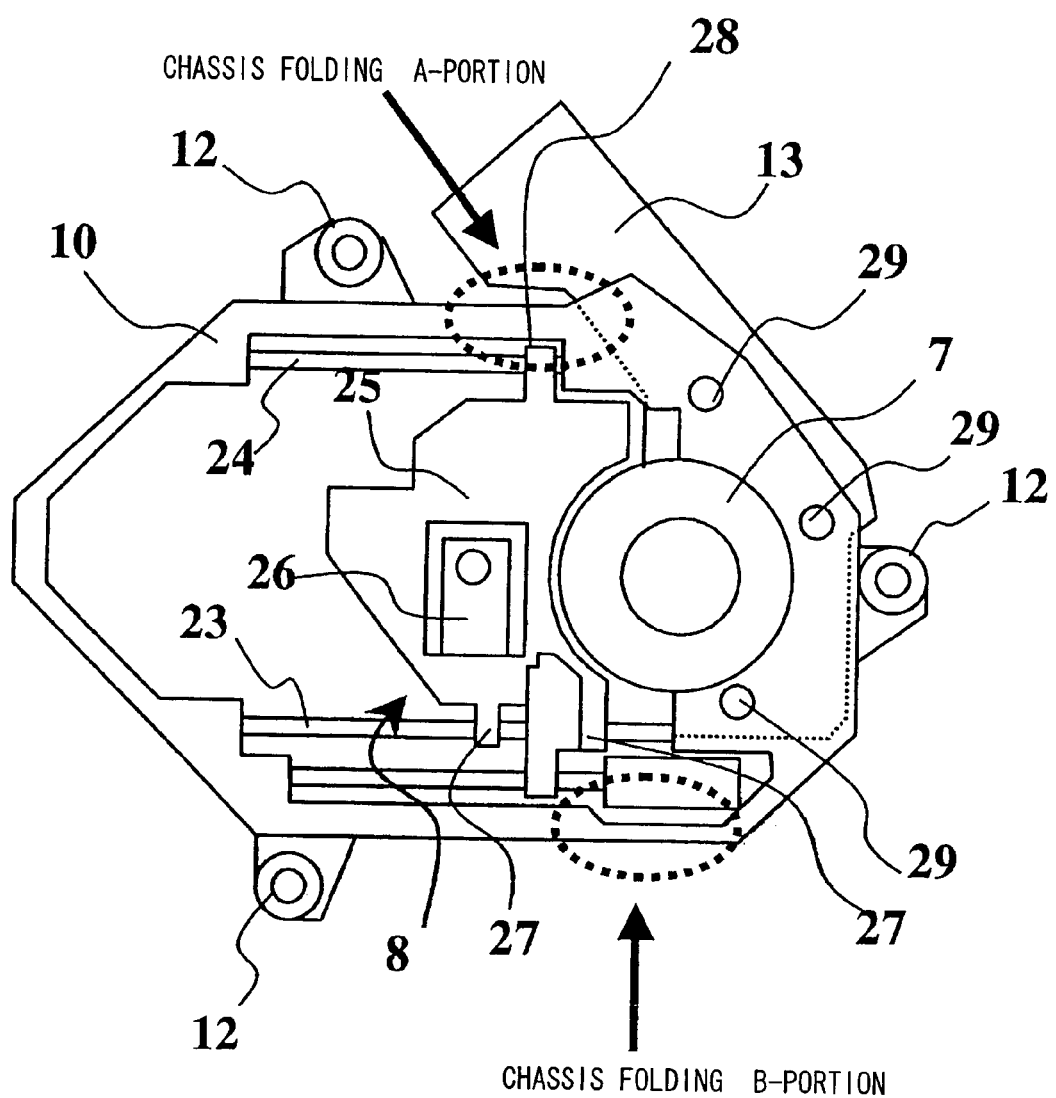
FIG. 2 is a view showing a unit mechanism structure of a typical slim optical disc drive.
Figure 3:
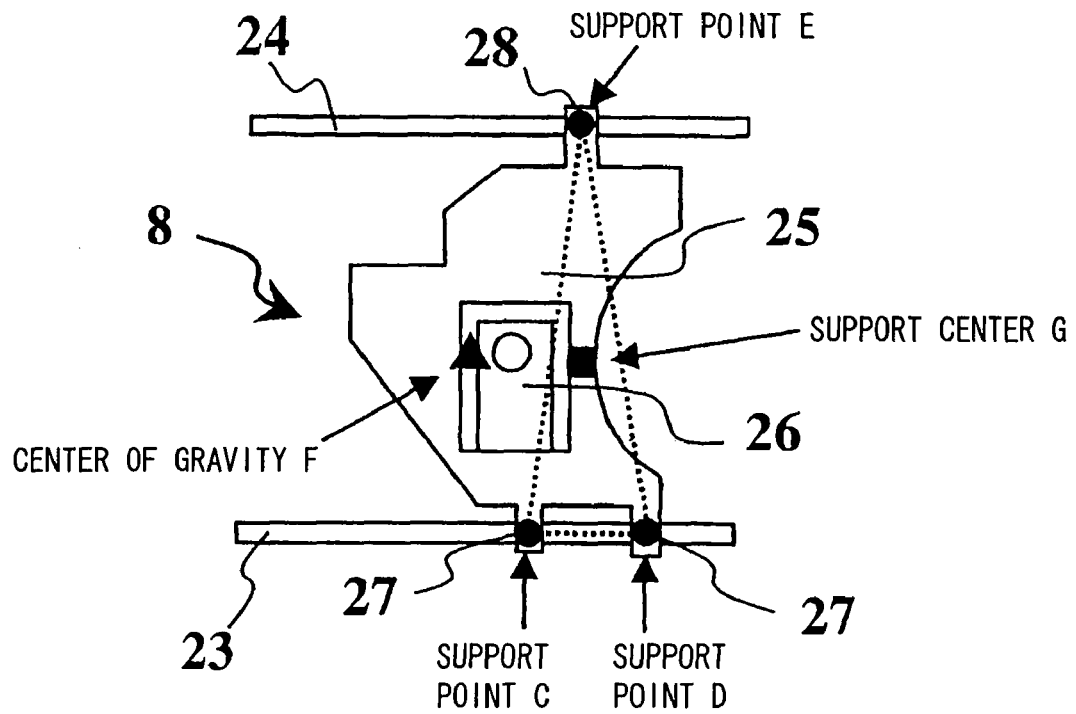
FIGS. 3A, 3B are views showing a movement of an optical head when an impact force is applied.
Figure 3:
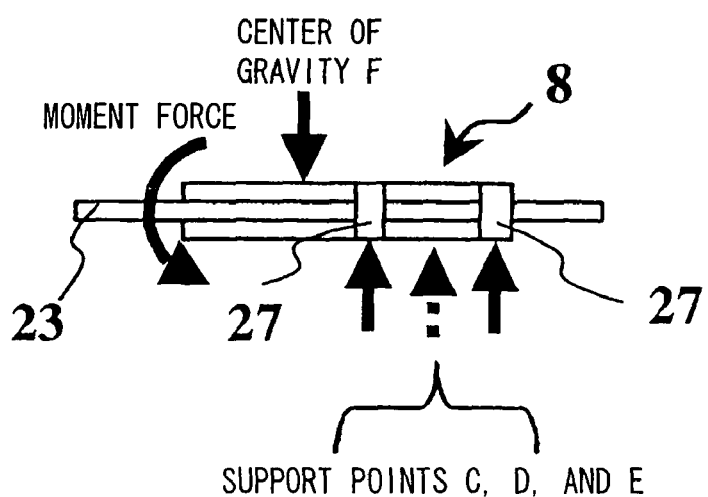

FIG. 2 is a top view showing the structure of the unit mechanism 6 in the optical disc drive 1 of the typical slim type. In order to explain the characteristic structure of the present invention, the unit cover 11 is removed in FIG. 2. The chassis 10 has the frame structure. The spindle motor 7, the optical head 8, a main guide bar 23, a sub guide bar 24, a driving motor and a drive force transmission gear are mounted inside the frame. The main guide bar 23, the sub guide bar 24, the driving motor and the drive force transmission gear serve as components of a device for moving the optical head 8 in the radial direction of the disc 2, respectively.

The characteristic structure of the present invention attains the prevention of damage of the inner parts at the time of the impact test of the optical disc drive 1. In particular, the optical head 8 serving as a main part in the optical disc drive 1 is targeted, for buffering such an impact force. As the state of the unit mechanism 6 at the time of the impact test is generally such that the optical head 8 is positioned near the spindle motor 7, as shown in FIG. 2. The spindle motor 7 is composed of a rotor portion serving as a rotating portion, a rotation shaft, a turn table for holding the disc, a stator portion serving as a fixed portion and the spindle motor board 13. The spindle motor 7 is fixed to the chassis 10, for example, by fastening screws at three points (a spindle motor supporter 29). With respect to the rotational central axis and the center of gravity of the spindle motor 7, the screw fastening portion 29 is biased to the right side (one side) of FIG. 2. Thus, when the impact force is applied, the leftward/rightward moment force acts on the spindle motor 7, and a collapse mode is consequently generated.

The moment force acting on the spindle motor 7 causes the chassis 10 to be elastically deformed in a folding mode at the A-portion and B-portion indicated by the dotted circular lines in FIG. 2 where their frame rigidities are weak.

FIGS. 3A, 3B are views showing the elastic displacement behavior of the optical head 8 when the impact force acts on the optical disc drive 1, similarly to FIG. 2. The optical head 8 has optical parts, such as a laser diode, a photo detector and the like, and an objective lens actuator 26 inside the optical head housing 25. The optical head housing 25 has a support structure so that it can be slid by the main guide bar 23 and the sub guide bar 24 for the guidance to the radial direction of the disc 2. The main guide bar 23 is supported with two bearing portions 27, and the sub guide bar 24 is supported with one bearing portion 28. The bearing portions 27 on the main shaft side are referred to as support points C, D, and the bearing portion 28 on the sub shaft side is referred to as a support point E. The center F of gravity of the optical head 8 exists at a point away from a position of a support center G between the support points C, D and E. Consequently, when the impact force is applied, the moment force shown in FIG. 3B acts on the optical head 8. Thus, the chassis 10, the main guide bar 23, the sub guide bar 24 and the optical head housing 25 are elastically deformed.

As explained in FIG. 2 and FIGS. 3A, 3B, the application of the impact force causes the optical head 8 to be elastically inclined upward/downwardly in the guide axis direction. When the impact force is applied, the optical head housing 25 is greatly inclined, to cause the instantaneous collision with the unit cover 11 existing above the optical head 8, the under cover 19 existing below, and the bottom cover 4.

Figure 4:
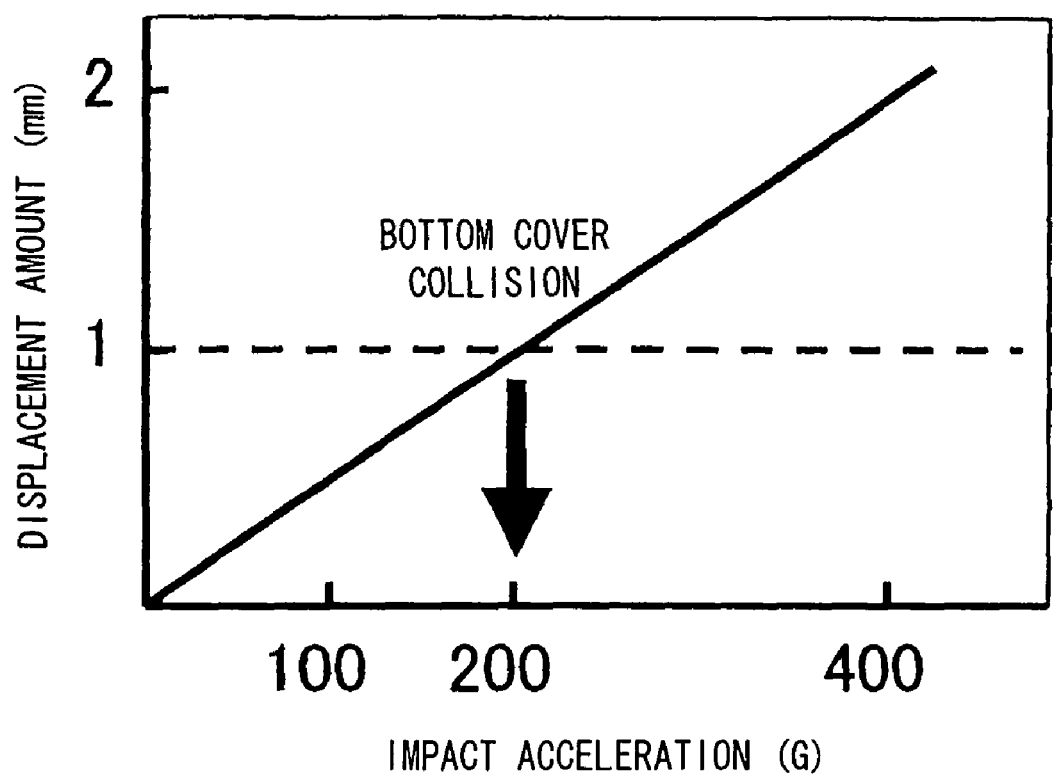
FIG. 4 is a view showing a relation between an impact acceleration and a displacement of the optical head inside the optical disc drive.
Figure 5:
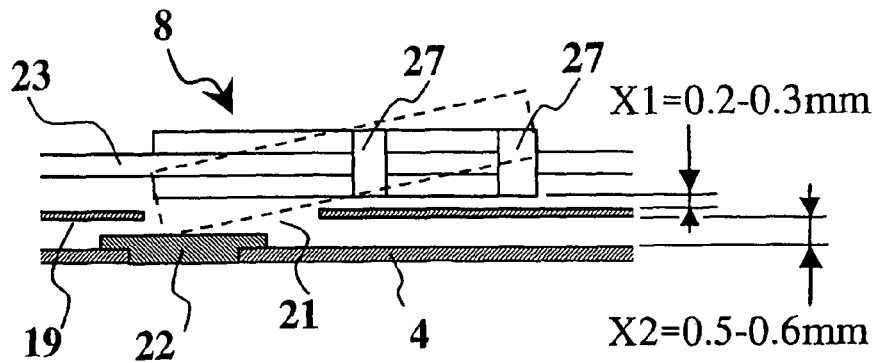
FIGS. 5A to 5C are views showing the structures of an under cover and a bottom cover according to an embodiment of the present invention.
Figure 5:
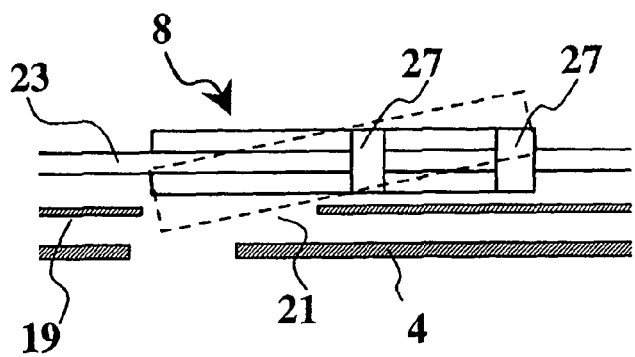
Figure 5:
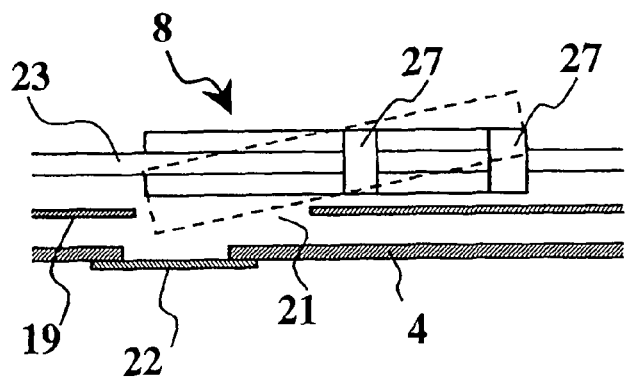
Figure 6:
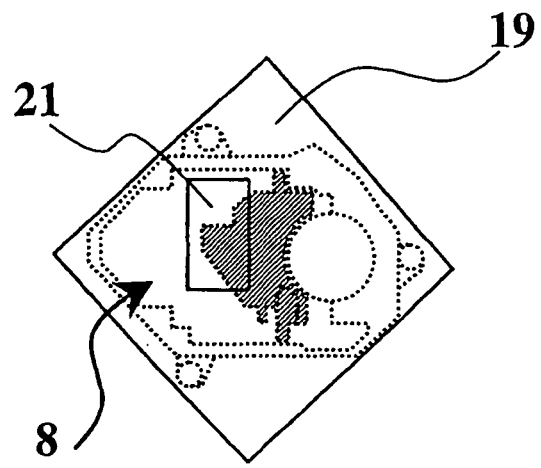
FIGS. 6A, 6B are views showing the arrangement of a contact evasion hole and an impact force buffering member that are provided in the under cover and the bottom cover respectively according to an example of the present invention.
Figure 6:
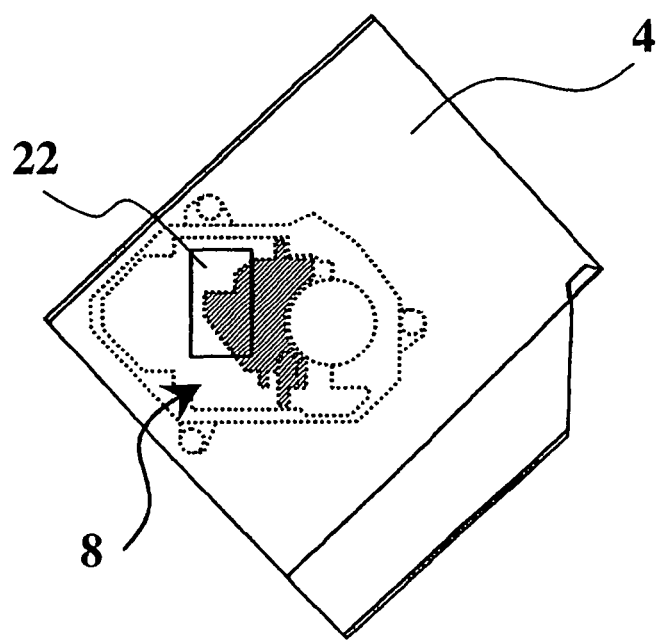
Figure 7:
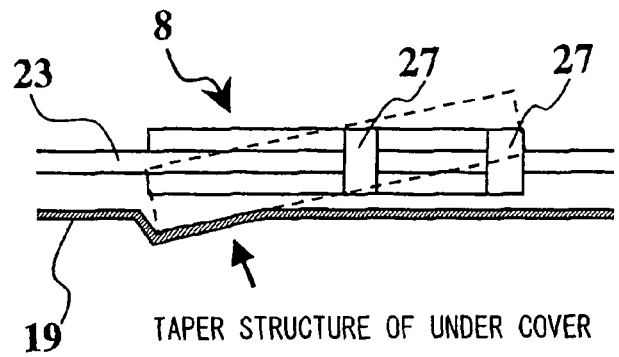
FIGS. 7A to 7C are views showing the impact buffering structure provided in an under cover and an optical head according to another embodiment of the present invention.
Figure 7:
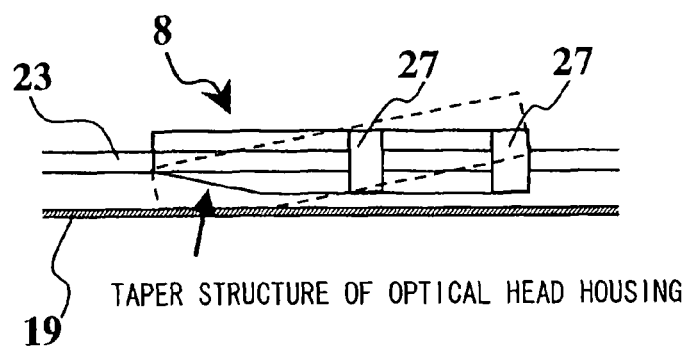
Figure 7:
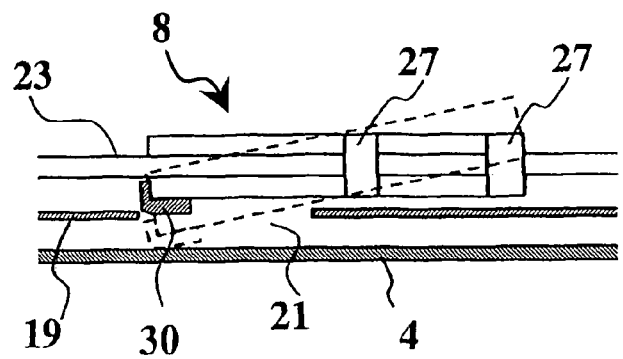
Figure 8:
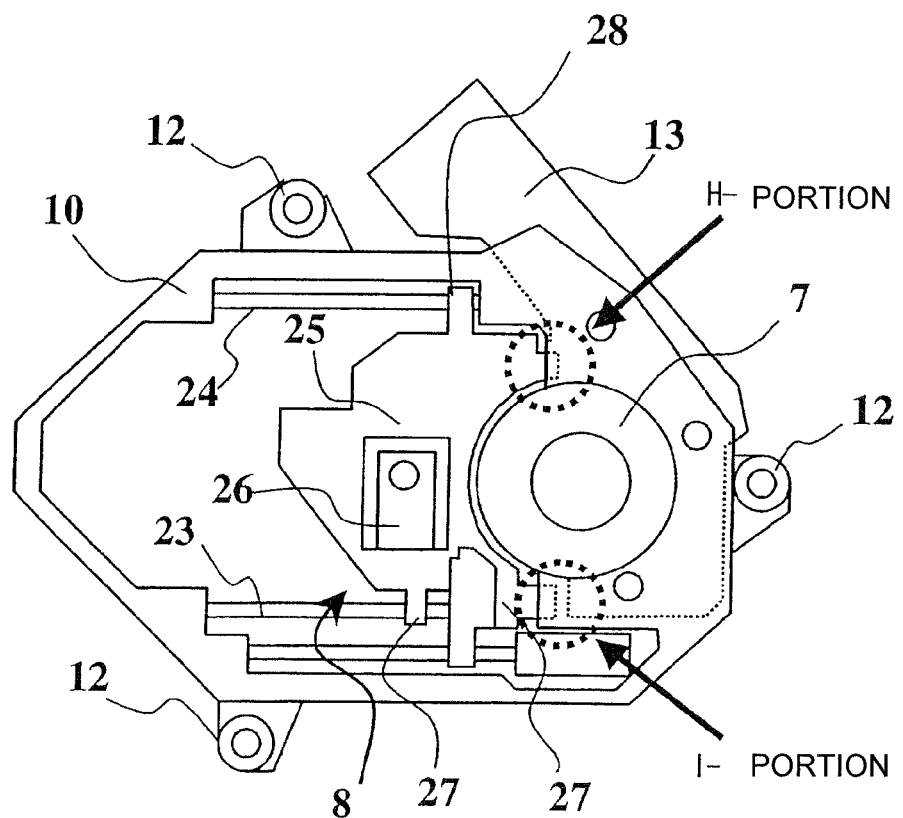
FIGS. 8A, 8B are views showing the impact buffering structure provided in a chassis according to another embodiment of the present invention.
Figure 8:
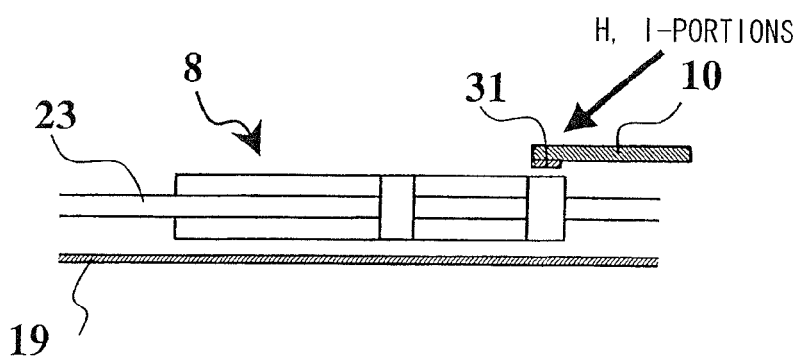

FIG. 4 shows the upward/downward displacement of the end of the optical head housing 25 due to each of elastic deformations of the unit mechanism 6 in the optical disc drive 1, when the upward/downward impact acceleration is added. An impact acceleration waveform is a half-wave between about 2 msec and 4 msec. In the impact test, there is a case that the impact acceleration of about 400 G is applied. In this case, the maximum displacement of the end of the optical head housing 25 is about 2 mm.

FIGS. 5A, 5B and 5C show the structures of the under cover 19 and the bottom cover 4, according to an embodiment of the present invention for buffering the impact force applied to the optical head 8. In the optical disc drive 1 of the slim type, a gap X1 between the bottom of the optical head housing 25 and the under cover 19 is between about 0.2 mm and 0.3 mm, and a gap X2 between the under cover 19 and the bottom cover 4 is between about 0.5 mm and 0.6 mm. The under cover 19 is made of a thin steel plate having a thickness of about 0.2 mm and the bottom cover 4 is made of a thin steel plate having a thickness of about 0.5 mm.

As shown in FIG. 4, the application of the impact acceleration of 400 G causes the optical head 8 to be collided with the under cover 19 and the bottom cover 4. In the embodiment of FIG. 5A, the under cover 4 is provided with the collision evasion hole 21 at a position which corresponds to the portion of large amount of upward/downward displacement due to the elastic displacement mode of the optical head housing 25. Moreover, the bottom cover 4 is also provided with a structure for buffering the impact force caused by the collision of the optical head housing 25, at a position which corresponds to the portion of the collision evasion hole 21 of the under cover 19. The impact force buffering structure provided on the bottom cover 4 has an impact force buffering member 22, which is mounted on a hole passing through the bottom cover 4 and is made of elastic material, resin material and the like, whose top surface is larger than the hole of the bottom cover 4.

This structure enables the impact force to be buffered without forming a convex on the outside surface of the casing of the optical disc drive 1. Also, in case of elastic member and the like, even if the instantaneous impact force is applied, a flaw or the like never remains on the appearance of the optical disc drive 1 due to the elastic deformation of the collided portion.

In FIG. 5B, the under cover 19 is provided with a collision evasion hole 21 and even the bottom cover 4 is provided with a hole portion in order to avoid the collision of the optical head housing 25. As shown in FIG. 4, when the impact acceleration at the time of the impact test is assumed to be about 200 G, the upward/downward displacement of the optical head housing 25 is about 1 mm. The gap between the bottom surface of the optical head housing 25 and the lower surface of the bottom cover 4 is between about 1.4 mm and 1.6 mm, and in the case of the foregoing impact acceleration, even if the impact force buffering member 22 does not exist in the hole structure of the bottom cover 4, the collision of the optical head 8 can be prevented.

FIG. 5C shows the structure in which as the impact force buffering member 22 provided on the hole portion of the bottom cover 4, a seal is assumed which is stuck on the outside of the optical head housing 25. The elastic deformation of the seal at the time of the collision enables the impact force to be buffered similarly to the other embodiment.

When the impact acceleration is applied to the optical disc drive 1, those structures can buffer the impact force caused by the collision of the optical head housing 25 or prevent the collision of the optical head housing 25, thereby to avoid the damage of the optical head 8.

FIGS. 6A, 6B show top views of the under cover 19 and the bottom cover 4. In order to explain the positions of the contact evasion hole 21 of the under cover 19 and the impact force buffering member 22 of the bottom cover 4, the unit mechanism 6 is indicated by the dotted line, and the optical head 8 is indicated by the slant line. At the time of the impact test of the optical disc drive 1, the optical head 8 is positioned on the side of the spindle motor 7. When the impact force is applied in the impact test, the end of the optical head housing 25 opposite to the spindle motor 7 is displaced in the upward/downward direction. Thus, as shown in FIGS. 6A, 6B, the contact evasion hole 21 and the impact force buffering member 22 should be positioned at the positions corresponding to the end of the optical head housing 25.

FIGS. 7A to 7C show the structure for buffering the impact force to be applied to the optical head, according to another embodiment of the present invention.

FIG. 7A shows such a structure that a taper structure is provided at a particular portion of the under cover 19 at which the optical head housing 25 is collided, to buffer the impact force, because the area of the collision with the optical head housing 25 is enlarged. FIG. 7A shows an embodiment in which the under cover 19 has the taper structure. However, the under cover 19 may have the contact evasion hole 21, and the portion of the bottom cover 4 may have the similar taper structure.

FIG. 7B shows one embodiment of the present invention in which the taper structure is provided on the optical head housing 25 that is collided with the under cover 19. Even in this structure, the effect of the area enlargement of the collision portion enables the impact force to be buffered.

FIG. 7C shows one embodiment of the present invention in which the end of the optical head housing 25 has an impact force buffering member 30. This structure is such that the under cover 19 is provided with a contact evasion hole 21, and the impact force buffering member 30 mounted on the optical head housing 25 collides with the bottom cover 4, and the impact force at that time is consequently buffered. The under cover 19 may not be provided with the contact evasion hole 21 so that the impact force is directly buffered by the under cover 19.

FIGS. 8A, 8B show the impact buffering structure mounted in the chassis 10 according to another embodiment of the present invention. As explained in FIG. 2 and FIGS. 3A, 3B, when the impact force is applied to the optical disc drive 1, the chassis 10 is elastically deformed in the folding mode, and the optical head housing 25 is also elastically deformed in the greatly inclining mode. The end of optical head housing on the side of the spindle motor 7 is upwardly displaced. According to the present invention, the end of the housing is covered by the chassis 10, in the upper portion of the housing near the spindle motor 7 of the optical head housing 25. FIG. 8A is the top view of the unit mechanism 6. Then, an H-portion and an I-portion, which are indicated by the dotted circles in the chassis 10, are the structures according to the present invention. In FIG. 8A, such structure is positioned at two positions respectively, but it may be positioned at only one position. FIG. 8B shows the sectional view of this structure, and an impact buffering member 31 is mounted at the collision position between the chassis 10 and the optical head housing 25. FIG. 8B shows the structure such that the impact buffering member 31 is mounted on the chassis 10. However, it may be mounted on the optical head housing 25.

With the above-mentioned structures, it is possible to provide the optical disc drive 1 having the high reliability, such that even if the impact force acts on the optical disc drive 1, the impact force to the optical head 8 is buffered, to prevent the damage of the parts inside the optical head 8.

As mentioned above, the optical disc drive of the present invention has been explained by exemplifying the specific embodiments. However, the present invention is not limited to them. One skilled in the art may add various modifications and improvements to the configurations and functions of the present invention according to the above-mentioned respective embodiments and other embodiments, in the range without departing from the scope and spirit of the present invention.

What is claimed is:

1. An optical disc drive, comprising:
   a casing including a top cover and a bottom cover, wherein said bottom cover has a hole to absorb an impact to an optical head;
   wherein the impact to the optical head is a direct impact between the bottom cover and an optical head housing that houses the optical head;
   wherein the hole is disposed so as to minimize an impact to the optical head when the optical head is disposed at the innermost circumference of the optical disc drive in a disc radius direction;
   wherein the hole of said bottom cover has a member to absorb the impact to the optical head; and
   wherein the member that absorbs the impact to the optical head is positioned below both said bottom cover and said top cover.

2. An optical disc drive comprising:
   an optical head housing that includes an optical head;
   a casing with a bottom cover and a top cover; and
   an under cover of a plate disposed between the optical head housing and the bottom cover of the casing;
   wherein in order to reduce an impact between the optical head housing and the bottom cover of a casing at an impact location, the optical disc drive includes the following impact absorbing mechanisms:
      the bottom cover of the casing having a hole in the impact location, and
      a solid buffering member affixed to the bottom cover and configured to cover the hole in the impact location, wherein the solid buffering member is disposed below both said bottom cover and said top cover, in an optical head movement direction upon impact;
   wherein the impact absorbing mechanisms are disposed so as to minimize an impact to the optical head when the optical head is disposed at the innermost circumference of the optical disc drive in a disc radius direction.

3. The optical disc drive according to claim 1, wherein an impact acceleration of the impact is at least 200G, and occurs during non-operation of the disc drive.

4. The optical disc drive according to claim 2, wherein an impact acceleration of the impact is at least 200G, and occurs during non-operation of the disc drive.

* * * * *